(12) United States Patent
Gross et al.

(10) Patent No.: US 8,548,621 B2
(45) Date of Patent: Oct. 1, 2013

(54) PRODUCTION SYSTEM CONTROL MODEL UPDATING USING CLOSED LOOP DESIGN OF EXPERIMENTS

(75) Inventors: Eric M. Gross, Rochester, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 415 days.

(21) Appl. No.: 13/017,485

(22) Filed: Jan. 31, 2011

(65) Prior Publication Data
US 2012/0197425 A1    Aug. 2, 2012

(51) Int. Cl.
*G06F 19/00*    (2011.01)
(52) U.S. Cl.
USPC .......................... 700/103; 700/104; 700/108
(58) Field of Classification Search
USPC .......................................... 700/103, 104, 108
See application file for complete search history.

(56) References Cited

U.S. PATENT DOCUMENTS

| | | | |
|---|---|---|---|
| 6,160,970 A | 12/2000 | Scheuer et al. | |
| 6,160,971 A | 12/2000 | Scheuer et al. | |
| 6,167,213 A | 12/2000 | Buranicz et al. | |
| 6,169,861 B1 | 1/2001 | Hamby et al. | |
| 6,173,133 B1 | 1/2001 | Donaldson et al. | |
| 6,175,698 B1 | 1/2001 | Scheuer et al. | |
| 6,181,888 B1 | 1/2001 | Scheuer et al. | |
| 6,223,006 B1 | 4/2001 | Scheuer et al. | |
| 6,611,665 B2 | 8/2003 | DiRubio et al. | |
| 6,714,319 B1 | 3/2004 | Thieret et al. | |
| 6,774,999 B2 | 8/2004 | Franzen et al. | |
| 6,807,390 B2 | 10/2004 | Suda et al. | |
| 6,917,770 B2 | 7/2005 | Bae et al. | |
| 6,931,219 B2 | 8/2005 | Viturro et al. | |
| 6,941,084 B2 | 9/2005 | Hamby et al. | |
| 7,024,125 B2 | 4/2006 | Ishi et al. | |
| 7,058,325 B2 | 6/2006 | Hamby et al. | |
| 7,120,369 B2 | 10/2006 | Hamby et al. | |
| 7,123,850 B1 | 10/2006 | Hamby et al. | |
| 7,154,110 B2 | 12/2006 | Mizes et al. | |
| 7,193,638 B2 | 3/2007 | Mizes et al. | |
| 7,228,080 B2 | 6/2007 | Hamby et al. | |
| 7,236,711 B2 | 6/2007 | Burry et al. | |
| 7,239,819 B2 | 7/2007 | Gross et al. | |
| 7,256,411 B2 | 8/2007 | Mizes et al. | |
| 7,271,910 B2 | 9/2007 | Paul et al. | |
| 7,283,240 B2 | 10/2007 | Mestha et al. | |
| 7,288,779 B2 * | 10/2007 | Schets et al. | 250/559.3 |
| 7,298,980 B2 | 11/2007 | Ramesh et al. | |
| 7,309,118 B2 | 12/2007 | Mizes et al. | |
| 7,313,337 B2 | 12/2007 | Burry et al. | |
| 7,325,899 B2 | 2/2008 | Burry et al. | |

(Continued)

FOREIGN PATENT DOCUMENTS

DE    3115351 A    4/1982
JP    56146156 A    11/1981

OTHER PUBLICATIONS

"A Brief Introduction to Design of Experiments", Telford, Johns Hopkins APL Technical Digest, vol. 27, No. 3 (2007).*

*Primary Examiner* — Michael D Masinick
(74) *Attorney, Agent, or Firm* — Fay Sharpe LLP

(57) ABSTRACT

Methods and production control systems are presented in which design of experiments are performed in situ and produce model parameter estimates that relate actuator set points to any number of response variables, and the model is periodically updated based on these designed experiments and used as the basis for determining actuator set points.

26 Claims, 10 Drawing Sheets

(56) References Cited

U.S. PATENT DOCUMENTS

| | | | |
|---|---|---|---|
| 7,425,972 B2 | 9/2008 | Updegraff et al. | |
| 7,492,381 B2 | 2/2009 | Mizes et al. | |
| 7,492,485 B2 | 2/2009 | Ramesh et al. | |
| 7,543,911 B2 | 6/2009 | Mizes et al. | |
| 7,545,531 B2 | 6/2009 | Gross et al. | |
| 7,552,986 B2 | 6/2009 | Mizes et al. | |
| 7,639,970 B2 | 12/2009 | Burry et al. | |
| 7,643,764 B2 | 1/2010 | Gross et al. | |
| 7,653,331 B2 | 1/2010 | Gross et al. | |
| 7,681,966 B2 | 3/2010 | Parker et al. | |
| 7,697,857 B2 | 4/2010 | Gross et al. | |
| 7,729,015 B2 | 6/2010 | Mizes et al. | |
| 7,755,799 B2 | 7/2010 | Paul et al. | |
| 7,756,433 B2 | 7/2010 | Gross et al. | |
| 7,840,297 B1* | 11/2010 | Tuszynski | 700/108 |
| 8,019,477 B2* | 9/2011 | Bash et al. | 700/276 |
| 2003/0038939 A1 | 2/2003 | Franzen et al. | |
| 2003/0138257 A1 | 7/2003 | DiRubio et al. | |
| 2004/0264985 A1 | 12/2004 | Hamby et al. | |
| 2005/0265739 A1 | 12/2005 | Hamby et al. | |
| 2005/0265740 A1 | 12/2005 | Hamby et al. | |
| 2005/0278070 A1* | 12/2005 | Bash et al. | 700/276 |
| 2006/0071185 A1 | 4/2006 | Mizes et al. | |
| 2006/0091229 A1* | 5/2006 | Bash et al. | 236/49.3 |
| 2006/0114282 A1 | 6/2006 | Mizes et al. | |
| 2006/0114283 A1 | 6/2006 | Mizes et al. | |
| 2006/0114287 A1 | 6/2006 | Burry et al. | |
| 2006/0114308 A1 | 6/2006 | Mizes et al. | |
| 2006/0165424 A1 | 7/2006 | Tabb et al. | |
| 2006/0216045 A1 | 9/2006 | Ramesh et al. | |
| 2006/0221341 A1 | 10/2006 | Paul et al. | |
| 2006/0222381 A1 | 10/2006 | Moriya et al. | |
| 2006/0222382 A1 | 10/2006 | Gady et al. | |
| 2006/0222387 A1 | 10/2006 | Burry et al. | |
| 2006/0245773 A1 | 11/2006 | Gross et al. | |
| 2007/0003297 A1 | 1/2007 | Hamby et al. | |
| 2007/0046941 A1 | 3/2007 | Mestha et al. | |
| 2007/0051908 A1 | 3/2007 | Mizes et al. | |
| 2007/0052991 A1 | 3/2007 | Goodman et al. | |
| 2007/0062685 A1* | 3/2007 | Patel et al. | 165/247 |
| 2007/0086799 A1 | 4/2007 | Burry | |
| 2007/0092274 A1 | 4/2007 | Ramesh et al. | |
| 2007/0109394 A1 | 5/2007 | Updegraff et al. | |
| 2007/0139733 A1 | 6/2007 | Mizes et al. | |
| 2007/0236747 A1 | 10/2007 | Paul | |
| 2008/0062219 A1 | 3/2008 | Mizes et al. | |
| 2008/0089708 A1 | 4/2008 | Gross et al. | |
| 2008/0089717 A1 | 4/2008 | Burry et al. | |
| 2008/0152369 A1 | 6/2008 | DiRubio et al. | |
| 2008/0152371 A1 | 6/2008 | Burry et al. | |
| 2008/0170245 A1 | 7/2008 | Gross et al. | |
| 2008/0175610 A1 | 7/2008 | Gross et al. | |
| 2009/0002724 A1 | 1/2009 | Paul et al. | |
| 2009/0009776 A1 | 1/2009 | Gross | |
| 2009/0033918 A1 | 2/2009 | Lin et al. | |
| 2009/0046325 A1 | 2/2009 | Paul et al. | |
| 2009/0059266 A1 | 3/2009 | Jackson et al. | |
| 2009/0173473 A1* | 7/2009 | Day | 165/67 |
| 2009/0180790 A1 | 7/2009 | Gross et al. | |
| 2009/0231382 A1 | 9/2009 | Mizes et al. | |
| 2009/0273813 A1 | 11/2009 | Viturro et al. | |
| 2009/0296158 A1 | 12/2009 | Paul et al. | |
| 2009/0297187 A1 | 12/2009 | Gross et al. | |
| 2009/0297221 A1 | 12/2009 | Gross et al. | |
| 2010/0003044 A1 | 1/2010 | Burry et al. | |
| 2010/0014877 A1 | 1/2010 | Sheflin et al. | |
| 2010/0080596 A1 | 4/2010 | Gross et al. | |
| 2010/0092191 A1 | 4/2010 | Sheflin et al. | |
| 2010/0092200 A1 | 4/2010 | Ramesh et al. | |
| 2010/0142982 A1 | 6/2010 | Moore et al. | |
| 2011/0032545 A1* | 2/2011 | Mestha et al. | 358/1.9 |

* cited by examiner

PRODUCTION SYSTEM CONTROL MODEL UPDATING USING CLOSED LOOP DESIGN OF EXPERIMENTS

BACKGROUND

The present exemplary embodiments relate to model-based production systems and closed loop control thereof using design of experiments techniques for updating production system models, and may be employed in control and operation of document processing systems such as printers, copiers, multi-function devices, etc. Production system resources and associated controllable actuators used to produce products are subject to systematic process shifts, structured disturbances, and random noise, all of which affect the ability to produce consistent product quality. For instance, printers and other document processing systems often suffer from time varying noises resulting in color variations on the final output prints, such as density and color shifts, uniformity variations in single dimensions such as streaks and bands, and uniformity variations in two dimensions such as graininess and mottle. Xerographic structured disturbances include quasi-stable noises such as periodic banding. Noises may have many root causes including environmental changes in relative humidity and temperature, component and material age and wear, and changes in print job history. Xerographic process controls and controllers for other production systems must accommodate uncertainties due to such noises and adjust process parameters to result in lower color variation and accurate output prints. Further, in many systems, measurements of the process for use in control should be minimized so as to maximize system productivity and reduce material waste.

BRIEF DESCRIPTION

The present disclosure relates to adaptive control of document processing systems and other production systems generally, in which in-loop Design-of-Experiments (DOE) tests are run to develop and update a robust system model.

Production systems are disclosed, including one or more resources that perform production operations to produce products, as well as actuators operative via control input signals or values to facilitate production of products. A model is provided, which correlates desired product characteristics and nominal operating points of the actuators, and a controller uses the model to generate control inputs for the actuators. The controller automatically performs an experiment including one or more runs in order to produce a corresponding set of test products corresponding to one or more desired test product characteristics, where the experiment in certain embodiments may be stored in the controller. In each run of the experiment, the controller provides actuator control input signals or values to the actuators to cause the resource to produce a test product based on nominal operating points defined by the desired test product characteristic(s). In addition, each run includes one or more predetermined perturbations by which an operating point of at least one of the actuators is offset from the actuator nominal operating point from the model, with two or more of the runs of the experiment having different predetermined perturbations. One or more system sensors are employed to sense the desired test product characteristic(s), and the controller analyzes the sensed characteristics relative to the desired characteristics and selectively updates the correlations between desired product characteristics and actuator nominal operating points of the model based on the analysis.

In certain embodiments, the controller performs multiple iterations of the experiment and analyzes multiple sets of test products, and may randomize or otherwise change the sequence of the runs for different iterations to counteract effects of periodic noise in adjustments to the model.

The controller in certain embodiments estimates changes to parameters or lookup table entries of the model based on the analysis and selectively performs a fuller experiment having a larger number of runs if one or more of the estimated changes is above a threshold.

The system in certain embodiments is a document processing system with marking device resources and a variety of actuators for controlled transfer of marking material onto a corresponding medium to produce test patch products. In some implementations, the test patches are produced in an inter-panel zone or other zone of the medium while continuing production of non-test products, or these may be produced during dedicated test operations. The controller automatically performs the runs of the experiment to produce test patches on the medium according to one or more desired test patch characteristics. In each run, the controller provides control inputs to the actuators to cause the marking device to produce a test patch on the medium according to actuator nominal operating points defined by the desired test patch characteristic(s). Each run includes one or more predetermined perturbations by which the operating point of an actuator is offset from the nominal operating point, and at least two of the experiment runs have different perturbations. The controller analyzes one or more sensed characteristics of the test patches relative to the desired characteristics and selectively updates the model. In certain implementations, moreover, the controller varies the test patch location on the medium for different iterations of the experiment, and in certain embodiments the test patch location is a perturbation of the experiment.

A method is provided for updating a production system model in accordance with certain aspects of the disclosure. The method includes automatically performing an experiment that includes multiple runs to produce a set of test products according a desired test product characteristic using one or more production system resources. Control input signals or values are provided to actuators in each run of the experiment to cause the resource to produce a corresponding test product according to actuator nominal operating points defined by the desired product characteristic, with each run including at least one predetermined perturbation by which the operating point of one of the actuators is offset from the actuator nominal operating point, and with two or more of the runs having different predetermined perturbations. The method also includes sensing the characteristic(s) of the test products produced in the experiment, as well as analyzing the sensed characteristics relative to the desired characteristics, and selectively updating the model correlations between desired product characteristics and actuator nominal operating points based at least partially on the analysis.

In certain embodiments, multiple iterations of the experiment are performed and multiple sets of test products are analyzed, where some implementations include changing the sequence of the runs for different iterations of the experiment. Certain embodiments also include estimating changes to parameters or lookup table entries of the model based on the analysis, and selectively performing a fuller experiment having a larger number of runs if at least one of the estimated changes is above a threshold, or if model correlation estimates lack sufficient precision.

In some embodiments involving a document processing system, control inputs are provided to cause a marking device to produce a set of test patches on a medium, and at least one marking material transfer condition of the test patches is sensed and analyzed relative to a desired test patch characteristic for selectively updating the model correlations. Certain implementations further involve changing the location of the test patches on the medium for different iterations of the experiment. In some embodiments, moreover, the test patches are produced in an inter-panel zone or other zone of the medium while continuing production of non-test products, at nominal actuator settings.

In some embodiments, the experiment is a blocked experiment in which the controller actuator changes the control input signals or values provided to the actuators to prevent cyclic disturbances from producing biased parameter estimates.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
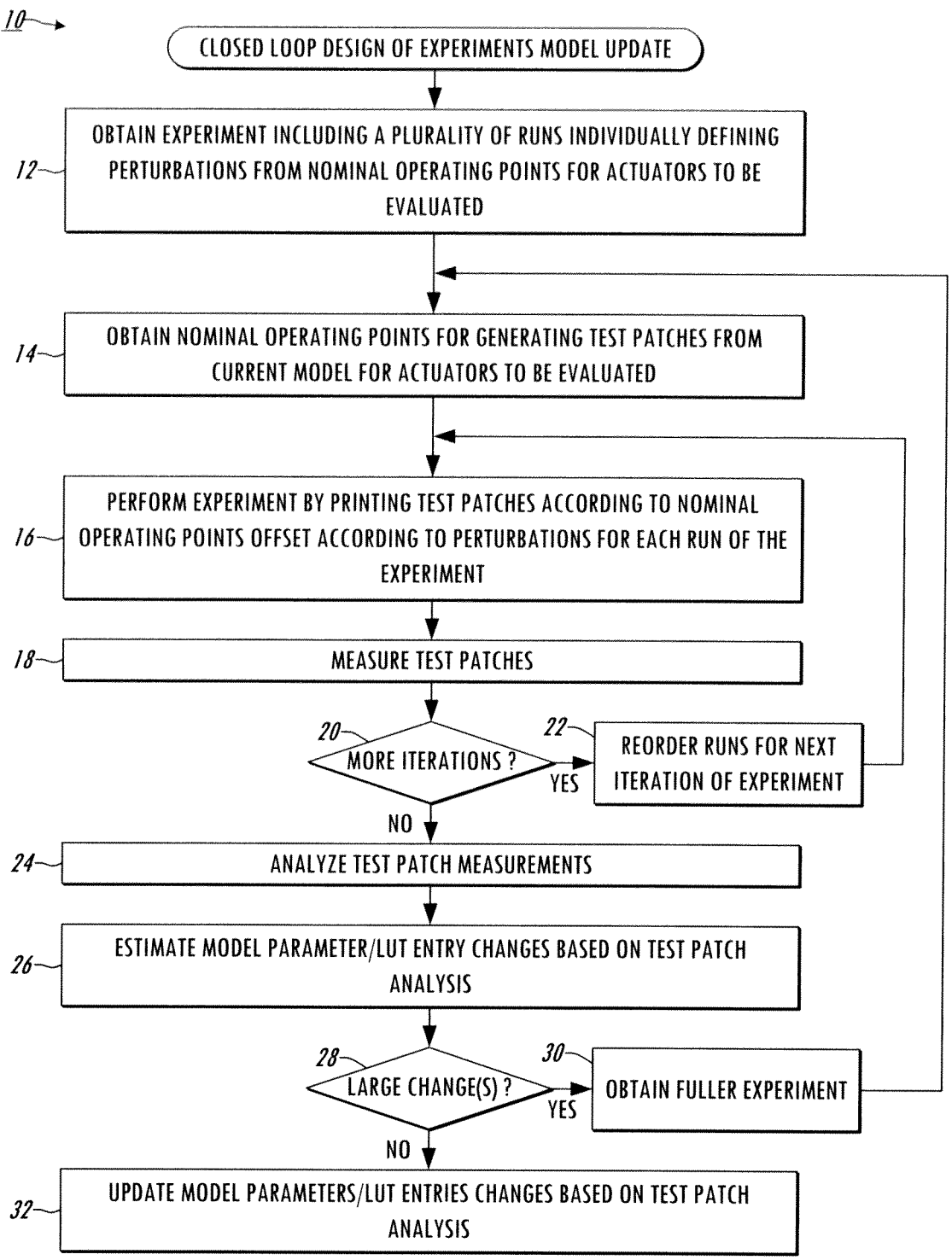
FIG. 1 is a flow diagram illustrating an exemplary method for updating a document processing system model in accordance with one or more aspects of the disclosure.

Several embodiments or implementations of the different aspects of the present disclosure are hereinafter described in conjunction with the drawings, wherein like reference numerals are used to refer to like elements throughout, and wherein the various features, structures, and graphical renderings are not necessarily drawn to scale. The disclosure relates to production systems generally and is hereinafter illustrated and described in the context of exemplary document processing systems having various marking and document transport resources with various controllable actuators having adjustment inputs operative according to a corresponding actuator control input signal or value to adjust an operating parameter associated with transfer of marking material onto a markable medium. Certain exemplary embodiments are illustrated and described below in the context of exemplary multi-color document processing systems that employ multiple xerographic marking devices or stations, including tandem and/or image-on-image (IOI) systems, in which toner marking material is first transferred to an intermediate medium and ultimately transferred to a final print medium to create images thereon in accordance with a print job, where test images or "patches" are created on an intermediate medium and/or on the final printed media for inspection and analysis in performing the designed set of experiments with predetermined perturbations in one or more actuator operating points. However, the techniques and systems of the present disclosure may be implemented in other forms of document processing or printing systems that employ any form of marking materials and techniques in which marking device fields are used for material transfer, such as ink-based printers, etc. Moreover, the concepts of the disclosure also find utility in association with other types and forms of system in which a plurality of resources, whether machines, humans, processor-executed software or logic components, objects, etc., may be selectively employed to produce products, wherein all such alternative or variant implementations are contemplated as falling within the scope of the present disclosure.

Printers and other production systems can often be modeled as static systems susceptible to noise. As a result, process controllers of such systems operate under a degree of uncertainty. Model based systems rely upon accurate system knowledge in determining control adjustments, and are preferably updated from time to time in order to counteract thermal and temporal drift effects on produced products. Performance of these production systems are often a tradeoff between many factors, and the tradeoffs affect the ability to do comprehensive control model updates. For example, printer control techniques balance convergence time at cycle up and initial transients in runtime, where lengthy cycle up times can cause customer dissatisfaction. For multi-color printers, the adjustment of actuator operating points in a system control model often involves dedicated testing by creating images on an intermediate transfer belt, for example, with a single actuator set update per belt cycle (e.g., 6 seconds in one example) utilizing 10 reads per cycle to average out significant belt signature variation. In addition to undesirability of lengthy testing time, such sampling can be expensive in terms of productivity. For instance, tandem printer architectures may require devices to cam away during sampling, which reduces productivity and is time consuming. Moreover, the presence of noise in a printer system (e.g., caused be sensor noise, noise correlated with belt location, and process noises) may lead to a system controller making wrong decisions resulting in undesired color shifts in the output prints. In particular, the controller may react to sensed changes caused by noise as opposed to actual changes in the production process.

The present disclosure relates to production system control using Design-Of-Experiments (DOE) techniques to facilitate proper control actions, particularly in the presence of system noise using updated system control models representing correlations between desired product characteristics and nominal operating points of the system actuators. A DOE system identification function is employed directly while the system is in operation, to provide adaptive control capabilities and the ability to address periodic and other forms of noise. These techniques find utility in controlling the production of color printed products as well as to other static systems, particularly systems for which "off line" or dead cycling like modes are available.

Figure 2:
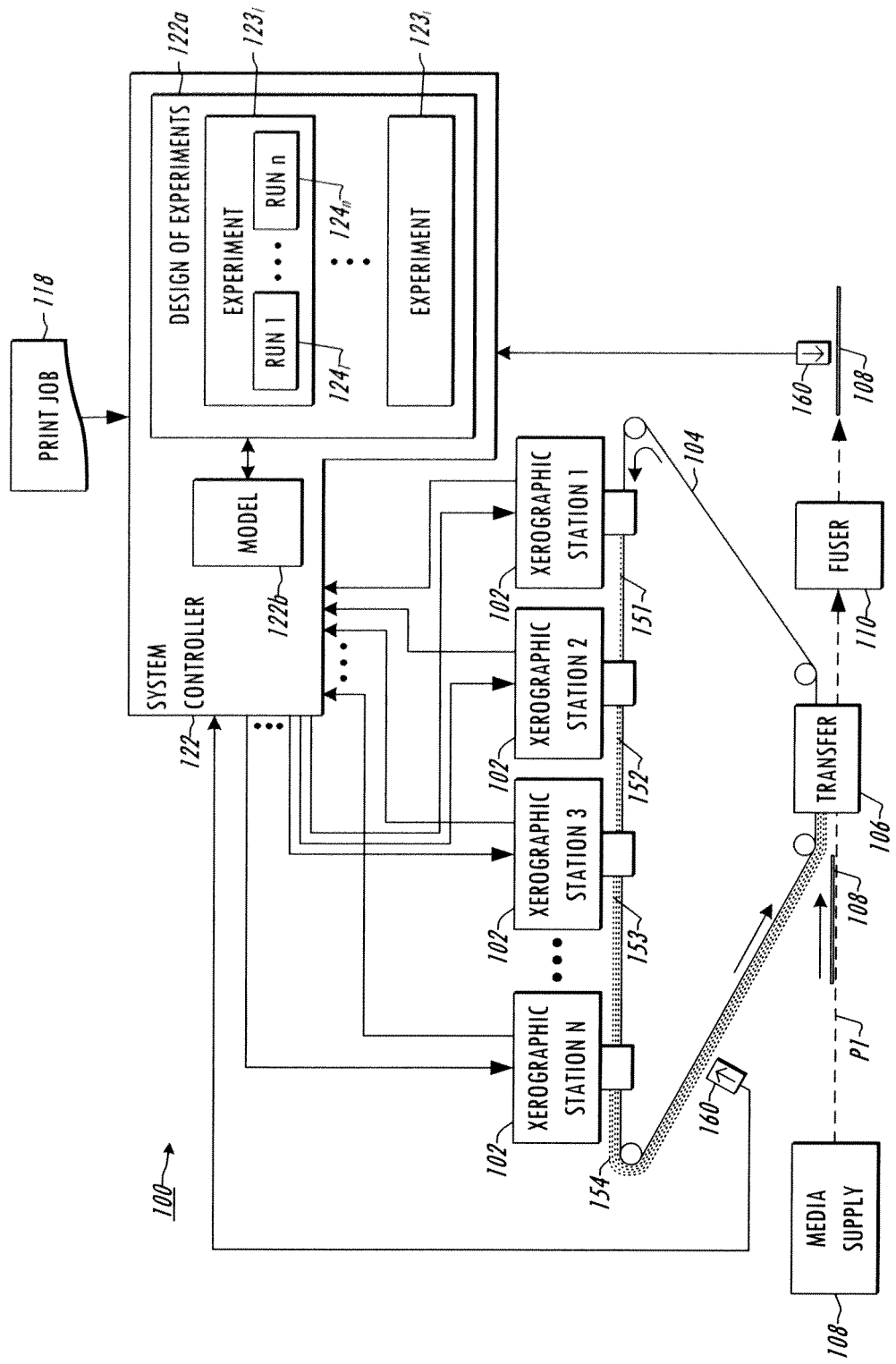
FIG. 2 is a simplified schematic system level diagram illustrating an exemplary multi-color document processing system with multiple xerographic marking devices disposed along a shared intermediate transfer belt (ITB) with a controller configured to automatically perform Design-Of-Experiments testing to update a system model in accordance with various aspects of the disclosure.

FIG. 1 illustrates an exemplary method 10 for updating a document processing system model using DOE techniques, and FIG. 2 illustrates an exemplary tandem multi-color document processing system 100, where the system 100 and a system controller 122 and marking devices 102 thereof may be operated in accordance with the method 10 in a normal printing mode and in dedicated calibration or other off-line modes to update a system model 122b. The controller 122 in certain embodiments stores the model 122b on-board (e.g., in controller memory) as either a lookup table (LUT) and/or as parameters of a parametric model that describes relationships between one or more desired characteristics of a produced product and nominal operating points of the actuators. For instance, for a given color value, the model 122b can include a corresponding nominal operating point for one or more actuators of the marking devices 102 or the system 100 generally that are believed to most closely accomplish the desired color in a printed document.

The system 100 includes a plurality of production resources, in this case xerographic marking devices or print engines 102 individually operative to transfer toner marking material onto an intermediate substrate 104 that may or may not be a photoreceptor, in this case, a shared intermediate transfer belt (ITB) 104 traveling in a counter clockwise direction in the figure past the xerographic marking devices 102. In other embodiments, a cylindrical drum may be employed as an intermediate transfer substrate, with the marking devices 102 positioned around the periphery of the drum to selectively transfer marking material thereto. In still other embodiments, the marking devices 102 may directly transfer marking material to a final printable media 108.

Figure 4:
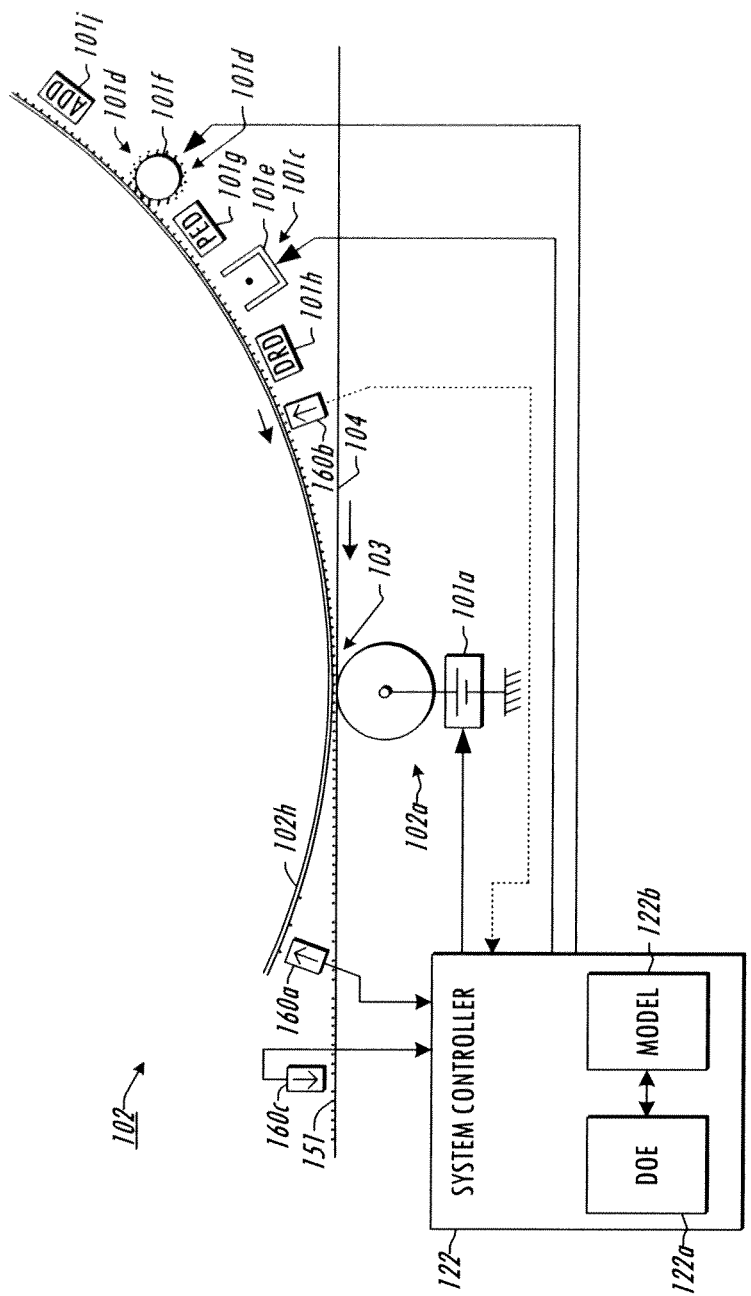
FIG. 4 is a schematic diagram illustrating further details of one of the marking devices and associated controllable actuators in the system of FIGS. 1 and 2.

Referring also to FIG. 4, each exemplary xerographic marking device 102 includes a photoreceptor drum 102b, with a variety of controllable actuator components, such as a pre-transfer charging subsystem 101e, a development subsystem 101f, a pre-transfer erase subsystem 101g, a pre-transfer debris removal subsystem 101h, a charging subsystem (e.g., charging system 210 in FIG. 8 below), an expose subsystem (e.g., expose system 220 in FIG. 8 below), and a cleaning subsystem (e.g., systems 260, 270 in FIG. 8 below), by which the toner image of a given color (e.g., cyan, magenta, yellow, black, or one or more spot toners or gamut extension colors such as orange or violet) is developed on a photoreceptor and transferred electrostatically to the intermediate transfer medium 104 using a biased transfer roller (BTR) 102a located on the inside of the intermediate transfer belt 104. The BTR 102a operates at a transfer field value set by a field strength control actuator 101a to control the transfer field used by the device 102 to transfer marking material, in this case, toner, to the medium 102. The pre-transfer erase device (PED) 101g is a pre-transfer expose device that at least partially discharges the photoreceptor 102b, the ADD component 101j represents an additive dispense device to the photoreceptor to reduce toner adhesion, and the DRD component 101h of FIG. 4 represents a debris removal device to remove carrier beads or other large contaminants from the photoreceptor prior to transfer.

Figure 3:
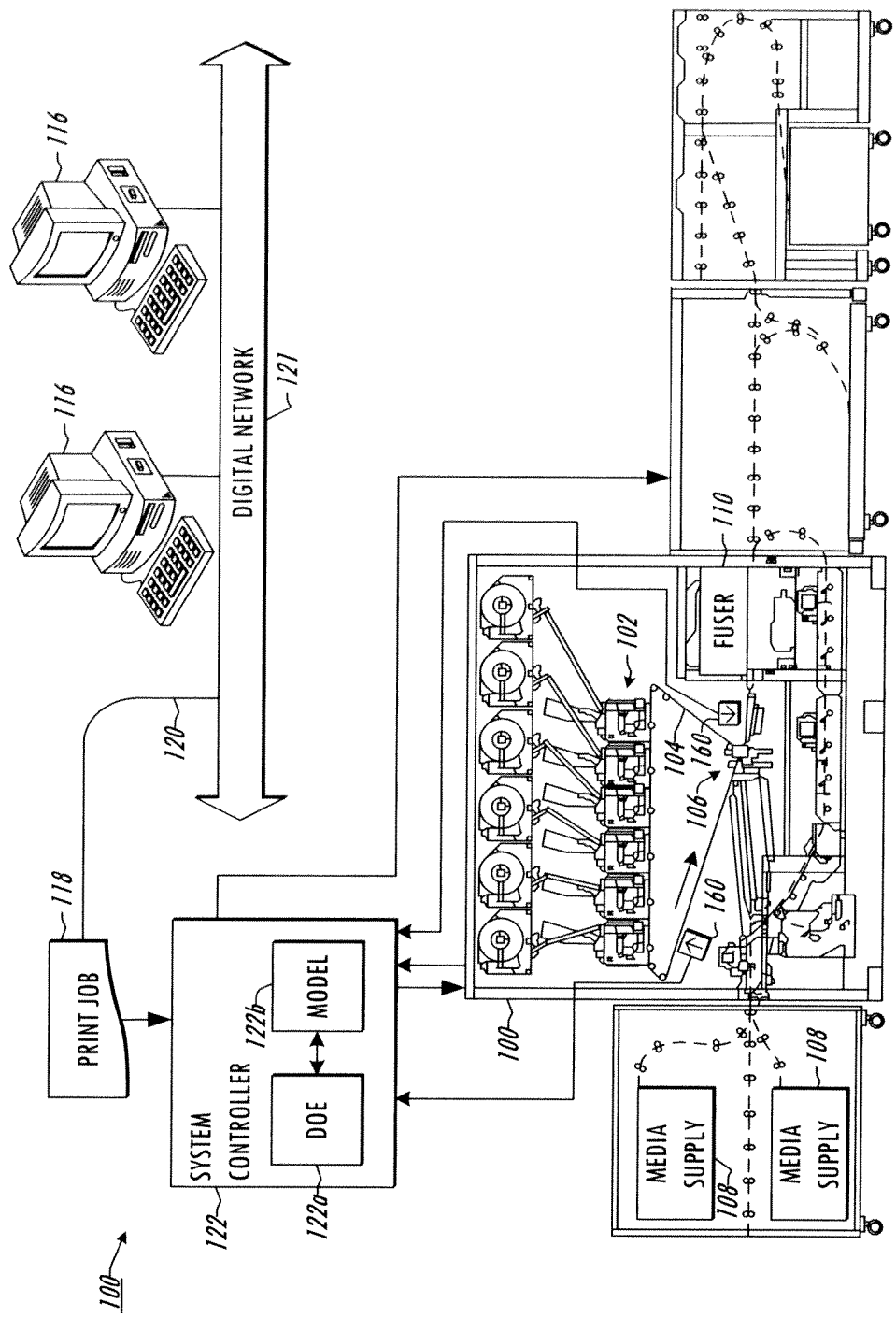
FIG. 3 is a detailed side elevation view illustrating an exemplary embodiment of the system of FIG. 2 in accordance with the present disclosure.
Figure 5:
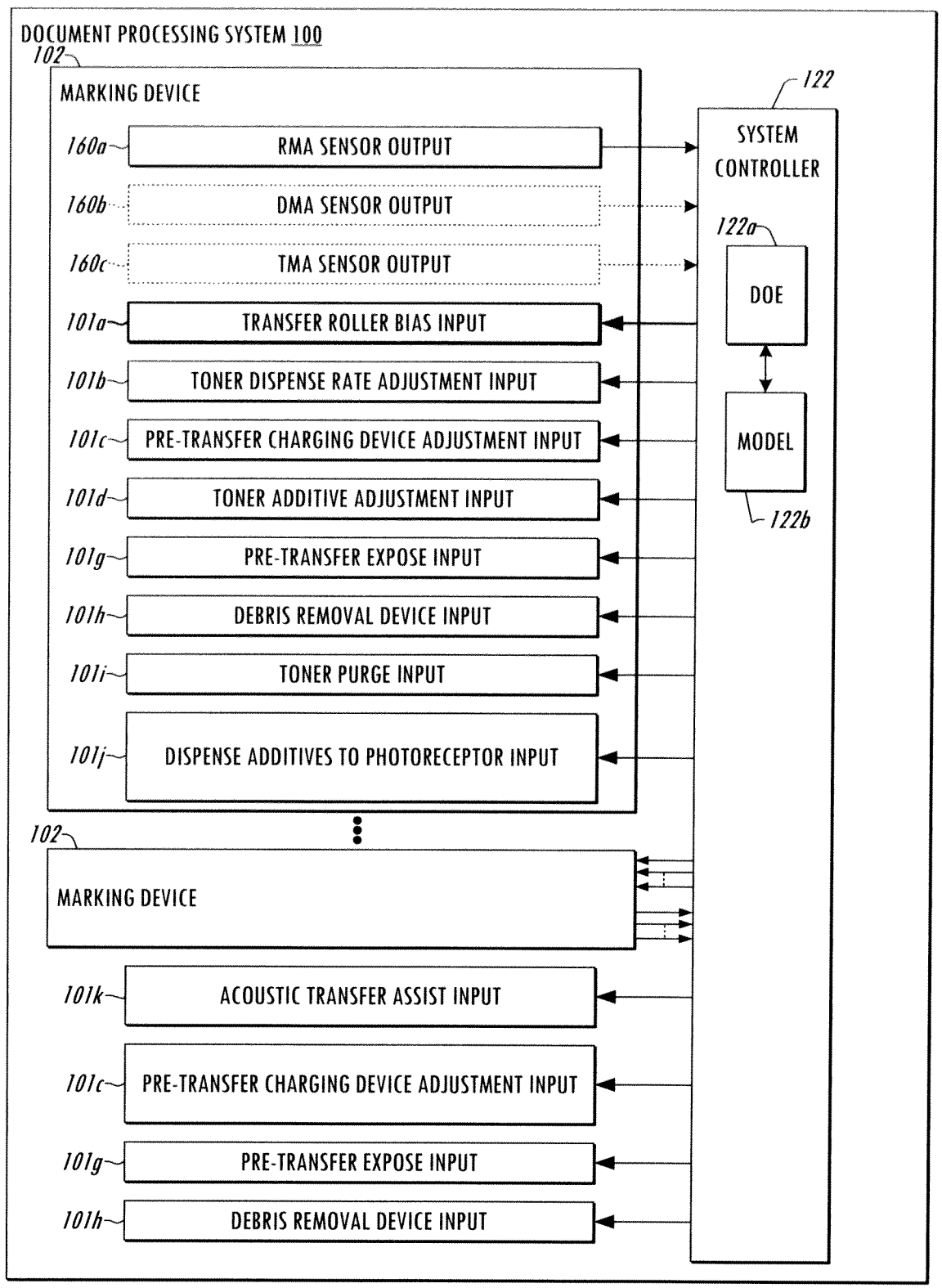
FIG. 5 is a schematic diagram illustrating various actuator adjustment inputs and sensor outputs of an exemplary xerographic marking device and connections thereof to the controller in the system of FIGS. 1 and 2.

Referring also to FIGS. 3 and 5, the system 100 may include any integer number N marking devices 102, such as six marking devices 102, as illustrated in FIG. 3. As seen in FIG. 5, the system 100 includes a variety of toner state adjustment actuators with corresponding adjustment inputs for individually adjusting an operating parameter associated with transfer of marking material onto the medium 104, where the marking devices 102 individually include at least one of the toner state adjustment actuators, and one or more of the toner state adjustment actuators are not associated with a specific one of the marking devices 102. It is noted that in the system 400 of FIGS. 7 and 8 below, it is possible that none of the toner state adjustment actuators is within a xerographic marking deice 102, and that the system could actuate only the pre-transfer device 101c, for example, which is external to all of the marking devices 102. Moreover, each of the exemplary marking devices 102 includes one or more transfer field control actuators 101 that control a transfer field used to transfer marking material to the medium 104, with the individual transfer field control actuators having a corresponding transfer field control input driven with a corresponding signal or control value by the controller 122.

The system 100 also includes a transfer component 106 (FIG. 2) disposed downstream of the marking devices 102 along a lower portion of the ITB path to transfer marking material from the ITB 104 to an upper side of a final print medium 108 (e.g., precut paper sheets in one embodiment) traveling along a path P1 from a media supply. After the transfer of toner to the print medium 108 at the transfer station 106 in FIG. 2, the final print medium 108 is provided to a fuser type affixing apparatus 110 on the path P1 where the transferred marking material is fused to the print medium 108.

The system controller 122 performs various control functions and may implement digital front end (DFE) functionality for the system 100, where the controller 122 may be any suitable form of hardware, processor-executed software, firmware, programmable logic, or combinations thereof, whether unitary or implemented in distributed fashion in a plurality of components, wherein all such implementations are contemplated as falling within the scope of the present disclosure. In a normal printing mode, the controller 122 receives incoming print jobs 118 and operates the marking devices 102 to transfer marking material onto the intermediate medium 104 in accordance with the print job 118, where the operating points for the various system actuators 101 are derived from the correlations of the system model 122b according to the desired product characteristics defined in the incoming print jobs 118.

The system 100 employs toner state sensing and other sensing techniques as feedback to the controller 122 for selective adjustment of various toner state adjustment actuators, including without limitation the development system 101f and/or the pre-transfer charging system 101c, and/or the expose system (220 in FIG. 8 below) in order to adjust or shift the toner transfer or adhesion relationship with respect to transfer field strength of the transfer field control actuator components (e.g., BTR 102a and field strength control 101a). In this regard, the system 100 includes one or more sensors 160, separate or associated with one or more of the individual marking device resources 102. The controller 122 generates actuator control signals or values provided as inputs to the various actuators 101 of the system 100. As shown in FIG. 5 below, examples of transfer field control inputs include inputs associated with the BTR 102a and field strength control 101a in FIG. 4 (e.g., transfer roller bias input 101a) associated with the marking devices 102, as well as any other input provided for controlling or modifying an electric or magnetic field used in transferring marking material to a medium in a document processing system. A non-exhaustive list of actuator inputs includes marking material (e.g., toner) dispense rate adjustment inputs (e.g., 101b), pre-transfer charging device adjustment inputs (e.g., 101c, whether associated with a specific marking device 102 or not), toner additive adjustment inputs (e.g., 101d), pre-transfer expose adjustment inputs and/or debris removal device inputs (e.g., 101g and/or 101h, for actuators specific to a marking device 102 and/or general system actuators), toner purge inputs (e.g., 101i), inputs controlling dispensing of additives to a photoreceptor (e.g., 101j), one or more acoustic transfer assist inputs (e.g., 101k), and/or any other input provided by the controller 122 to a system actuator 101 that affects a marking material transfer condition of the medium 104 to which the marking material is transferred by one or more marking devices 102.

The exemplary marking devices 102 include one or more sensors 160 providing input signals or values to the controller 122, such as an optical (e.g. reflective) sensor 160a downstream of the BTR 102a (FIG. 4) for sensing the residual mass per unit area (RMA) of marking material (e.g., toner) 151 not transferred from the drum 102b to the ITB 104, and an optional sensor 160b upstream of the BTR 102a for sensing the developed toner mass per unit area (DMA) or an optional sensor (e.g. an optical reflectance sensor) 160c downstream of the BTR 102a for sensing the transferred mass per unit area on the ITB 104. Moreover, one or more sensors 160 may be provided for measuring a marking material transfer condition of the medium 104 separate from any of the marking devices 102. Any type of sensor or sensors 160 may be employed which measure or sense toner state characteristics from which the toner transfer state of the marking device 102 can be derived. Suitable types of sensors 160a, 160b, and 160c are described in U.S. Pat. No. 7,190,913, filed Mar. 31, 2005, owned by the assignee of the present disclosure, the entirety of which patent is hereby incorporated by reference in its entirety as if fully set forth herein.

In operation of the marking devices 102, marking material (e.g., toner 151 for the first device 102 in FIG. 4) is supplied to the drum 102b. A surface of the intermediate medium 104 is adjacent to and/or in contact with the drum 102b and the toner 151 is transferred to the medium 104 with the assistance of the biased transfer roller 102a, where the BTR 102a induces charge into the BTR and ITB surfaces 104 to attract oppositely charged toner 151 from the drum 102b to the ITB surface as the ITB 104 passes through a nip 103 created between the drum 102b and the charged transfer roller 102a, where the transfer charging is controlled by a bias control 101a operated by the system controller 122. The toner 151 ideally remains on the surface of the ITB 104 after it passes through the nip 103 for subsequent transfer and fusing to the final print media 108 via the secondary transfer device 106 and fuser 110 in FIGS. 2 and 3.

The marking device 102 may suffer from incomplete transfer in which case a small amount of toner 151 remains on the drum 102b downstream of the BTR 102a, particularly for low transfer field levels. The exemplary sensor 106a is operatively coupled with the controller 122 and located proximate the downstream side of the drum 102b to detect the amount of untransferred toner 151 remaining on the drum 102b, where the illustrated example provides the sensor 160a as a residual mass per unit area (RMA) sensor that measures or senses the mass of residual toner 151 per a given area on the drum surface remaining after the drum 102b passes the nip 103. The device 102 (or the system 100 generally) can optionally include additional sensors 160, such as a transferred mass/area (TMA) sensor 160c for sensing the amount of toner 151 that is transferred to the intermediate medium 104, and a developed mass/area (DMA) sensor 160b that detects the amount of toner 151 supplied on the drum 102b upstream of the nip 103.

As best shown in FIG. 2, each of the xerographic marking devices 102 is operable under control of the controller 122 to transfer toner 151-154 of a corresponding color (e.g., cyan (C), magenta (M), yellow (Y), black (K)) to the transfer belt 104, where the first device 102 encountered by the ITB 104 in one example provides yellow toner 151, the next device provides magenta toner 152, the next provides cyan toner 153, and the last device 102 provides black toner 154, although other organizations and configurations are possible in which two or more marking devices 102 are provided.

Figure 10:
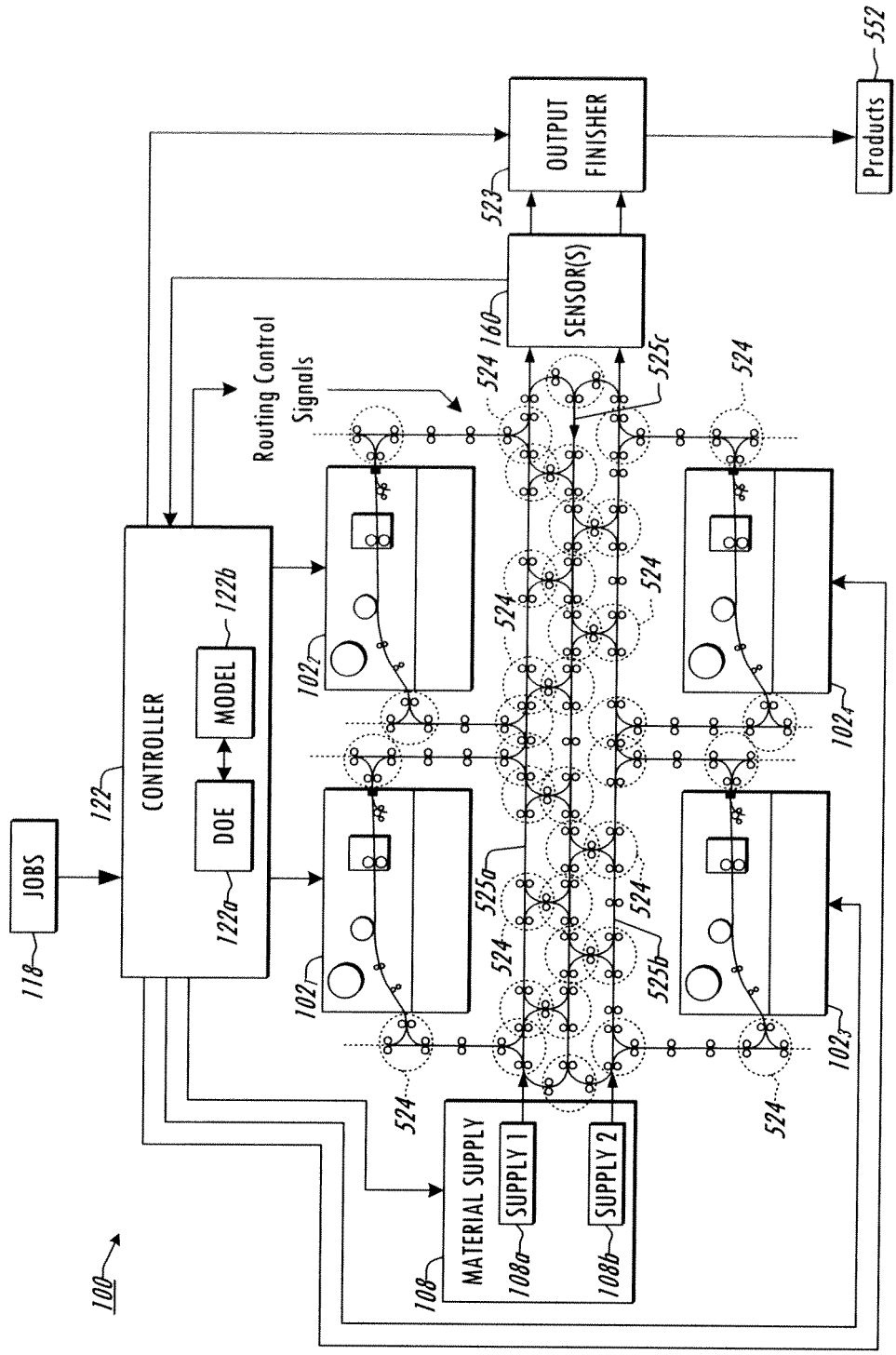
FIG. 10 is a schematic diagram illustrating an exemplary modular printing system.

FIG. 3 depicts a system 100 having six marking devices 102 configured along a shared or common intermediate transfer belt 104. FIG. 3 shows an exemplary system 100 including an embodiment of the above-described document processing system 100 having six marking stations 102 along with a transfer station 106, a supply of final print media 108, and a fuser 110 as described in FIG. 2 above. In normal operation, print jobs 118 are received at the controller 122 via an internal source such as a scanner (not shown) and/or from an external source, such as one or more computers 116 connected to the system 100 via one or more networks 121 and associated cabling 120, or from wireless sources. The print job execution may include printing selected text, line graphics, images, magnetic ink character recognition (MICR) notation, etc., on the front and/or back sides or pages of one or more sheets of paper or other printable media 108. In this regard, some sheets may be left completely blank in accordance with a particular print job 118, and some sheets may have mixed color and black-and-white printing. Execution of the print job 118, moreover, may include collating the finished sheets in a certain order, along with specified folding, stapling, punching holes into, or otherwise physically manipulating or binding the sheets. In certain embodiments the system 100 may be a stand-alone printer or a cluster of networked or otherwise logically interconnected printers, with each printer having its own associated print media source and finishing components including a plurality of final media destinations, print consumable supply systems and other suitable components. Alternately the system may be comprised of multiple marking engines 102 with a common media supply 108 and common finishers that are configured either serially or in parallel (separate parallel paper paths between feeding and finishing) as shown in FIG. 10. The parallel configuration has the advantage that if one or more of the marking engines is inoperable, printing can continue on the remaining operable marking engines.

As best illustrated in FIGS. 2, 4, and 5, the individual marking devices 102 include a transfer field control input 101a for setting the transfer field level used to transfer marking material 151, 152, 153, 154 onto the intermediate substrate 104, as well as one or more sensors 160 operative to sense a marking material transfer condition such as RMA, TMA, DMA, etc., associated with the marking device 102. One or more adjustment inputs 101b-101k are selectively actuated by the controller 122 in implementing a print job or in performing a design of experiments run as described below. In the example of FIGS. 4 and 5, the device-specific adjustment inputs that can be changed by the controller 122 include a toner dispense rate control input 101b to adjust a charge to mass ratio of a mixture of toner and carrier in the marking device 102, a pre-transfer charging device adjustment control input 101c to adjust toner charge state in the marking device 102, a pre-transfer erase device control input 101g to adjust the photoreceptor transfer field in the nip region 103 of the marking device 102, a pre-transfer debris removal device adjustment control input 101h to remove large particles prior to the transfer nip region 103, and/or a toner additive state adjustment control input 101d to adjust a toner additive state in the marking device 102.

Toner purge stripes can be employed using the expose and the development subsystem 101f. The expose system is used in conjunction with the development sub-system 101f to generate toner purge stripes in the cross process direction in the inter-document zone between printing panels associated with adjacent pages. The purge stripes are transferred to the medium 104 and eventually cleaned by the cleaner on the medium. These stripes are not transferred to the paper 108 since they are printed in the inter-document zone. The marking devices 102 may also provide a toner purge control input 101i (FIG. 5) to adjust toner age and/or concentration of the marking device 102 by purging toner to reduce the toner concentration (ratio of toner to carrier) in the development sump, which increases the toner charge. In an alternate embodiment, the toner purge stripes may be developed during dedicated cycles, known as skipped pitches, wherein the printing of customer images has been temporarily suspended. The toner purge reduces toner age by dispensing fresh toner into the development sump. Compaction of surface spacer additives in aged toners can increase toner adhesion and adversely impact the toner adhesion state.

Figure 6:
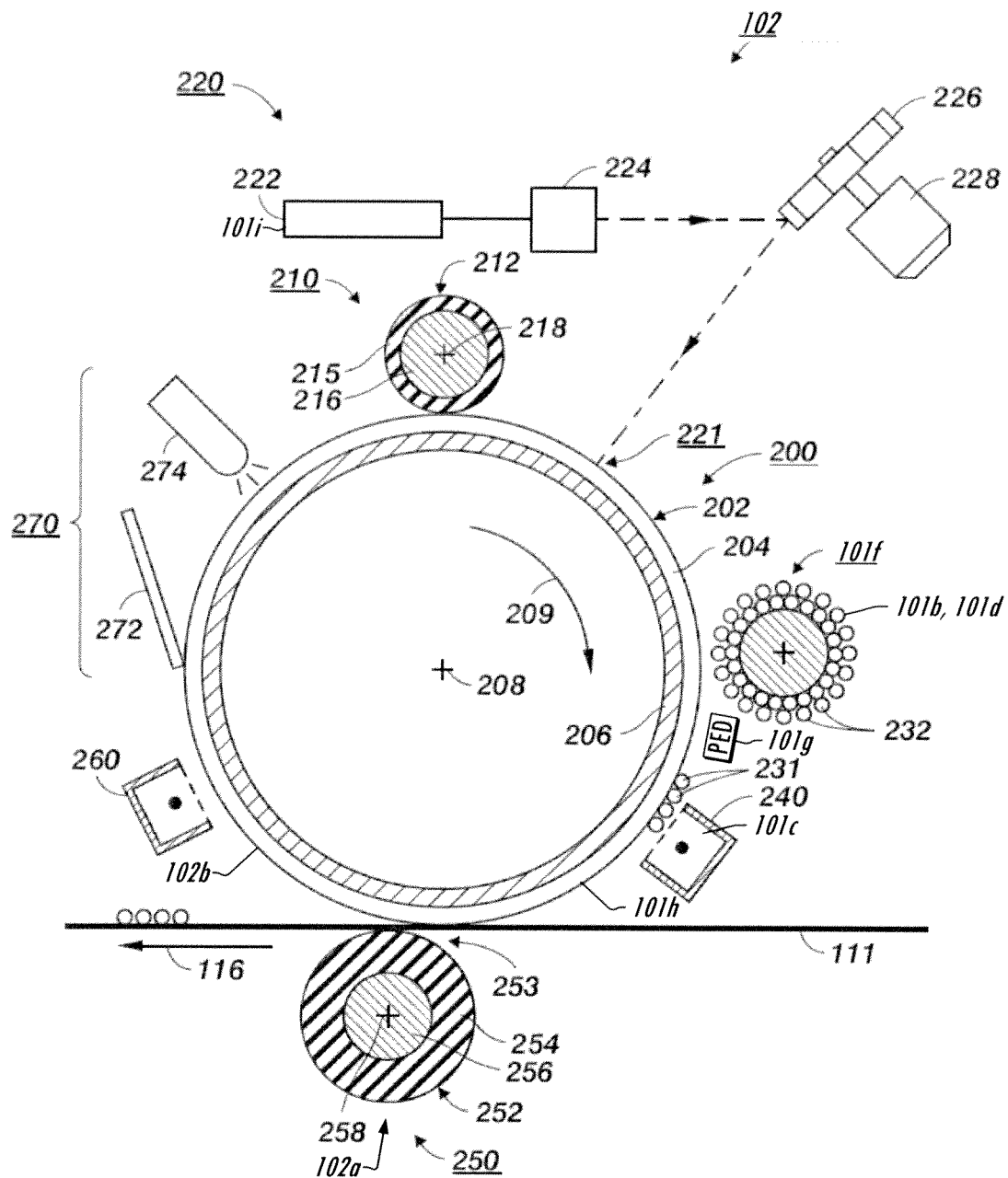
FIG. 6 is a schematic diagram illustrating an exemplary xerographic imaging apparatus.

FIG. 6 illustrates another exemplary marking device 102 which can be one of multiple marking devices in a document processing system 100. The device 102 of FIG. 6 includes a photoreceptor 200 (also referred to as OPC), a charging station or subsystem 210, a laser scanning device or subsystem 220, such as a rasterizing output scanner (ROS), a toner deposition/development station or subsystem 101f, a pre-transfer station or subsystem 240, a transfer station or subsystem 250, a precleaning station or subsystem 260, and a cleaning/erase station 270. The photoreceptor 200 in this embodiment is a drum, but other forms of photoreceptor could conceivably be used. The photoreceptor drum 200 includes a surface 202 of a photoconductive layer 204 on which an electrostatic charge can be formed, and which layer 204 behaves like a dielectric in the dark and a conductor when exposed to light. The photoconductive layer 204 is mounted or formed on a cylinder 206 that is mounted for rotation on a shaft 208 in the direction of the arrow 209. The charging station 210 includes a biased charging roller 212 that charges the photoreceptor 200 using a DC-biased AC voltage. The biased charging roller 212 includes a surface of one or more elastomeric layers 215 formed or mounted on an inner cylinder 216, such as a steel cylinder or other suitable material, mounted for rotation about an axis of a shaft 218.

The laser scanning device 220 can be implemented as a single actuator for DOE model updates or as a group of included actuators. The device 220 includes a controller 222 that modulates the output of a laser 224, such as a diode laser, whose modulated beam shines onto a rotating mirror or prism 226 rotated by a motor 228. The mirror or prism 226 reflects the modulated laser beam onto the charged OPC surface 202, panning it across the width of the OPC surface 202 so that the modulated beam can form a line 221 of the image to be printed on the OPC surface 202. In this way a latent image is created by selectively discharging the areas which are to receive the toner image. Exposed (drawn) portions of the image to be printed move on to the toner deposition station 101f, where toner 232 adheres to the drawn/discharged portions of the image. The exposed portions of the image with adherent toner then pass to the pretransfer station 240 and on to the transfer station 250. The pre-transfer station 240 is used to adjust the charge state of the toner and photoreceptor in order to optimize transfer performance. The transfer station 250 includes a biased transfer roller 252 arranged to form a nip 253 on an intermediate transfer belt medium 104 with the OPC 200 for transfer of the toner image 231 onto the medium 104 traveling in the direction 116. The biased transfer roller 252 includes one or more elastomeric layers 254 formed or mounted on an inner cylinder 256, and the roller 252 is mounted on a shaft 258 extending along a longitudinal axis of the roller 252. The biased transfer roller 252 carries a DC potential provided by a high voltage power supply, and the voltage applied to the roller 252 draws the toner image 231 from the photoreceptor surface 202 to the medium 104. After transfer, the OPC surface 202 rotates to the precleaning subsystem 260 and thereafter to the cleaning/erasing substation 270, where a blade 272 scrapes excess toner from the OPC surface 202 and an erase lamp 274 reduces the static charge on the OPC surface.

Figure 9:
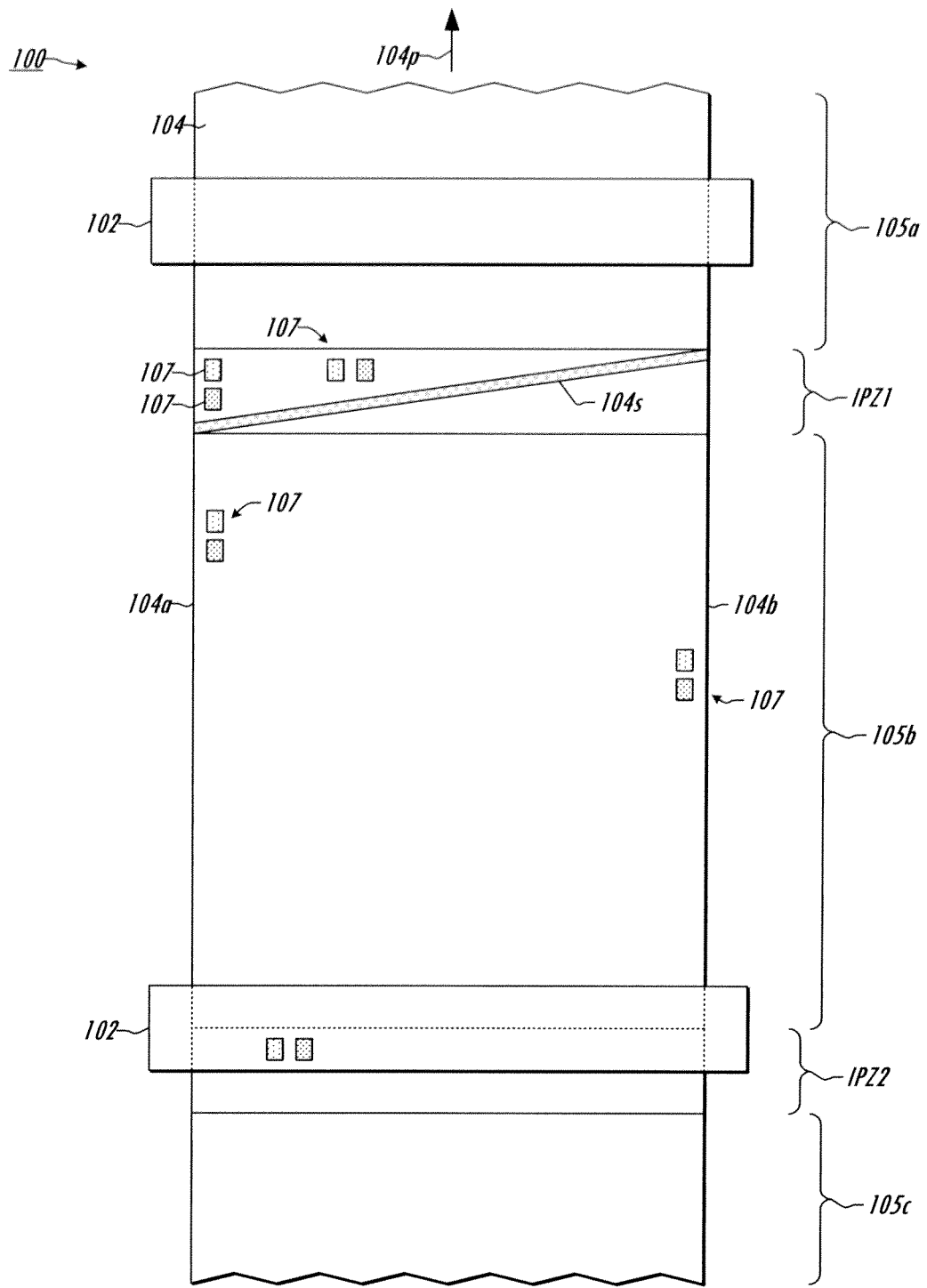
FIG. 9 is a partial top plan view illustrating a portion of the exemplary photoreceptor belt in the system of FIGS. 7 and 8 with image panel zones separated by inter panel zones in which test patches are produced for closed loop Design-Of-Experiments adjustment of the printer model.

In accordance with the present disclosure, the controller 122 automatically performs an experiment 123 including a plurality of runs 124 to produce a corresponding set of test products 107 according to one or more desired test product characteristics, and uses an analysis of the test products to update the model 122b. The update mode can be concurrent with the normal production mode in that the system 100 may create the test products (e.g., test images) while also producing desired products for a customer. In this regard, as shown in FIG. 9 below, the controller 122 can cause the generation of test images or patches 107 in an inter-panel zone (IPZ) or other zone of the medium 104, 108 while continuing production of non-test products. Alternatively or in combination, the DOE model update operation can be performed separate from normal production, for instance, at system startup, shutdown, during periods of no/low production, and/or the controller 122 may enter the adjustment mode and perform the experiment(s) upon operator demand, periodically, or at other times, such as initiated by an external device through a network connection.

The controller 122 in certain embodiments operates generally according to the method 10 of FIG. 1 for closed loop DOE model updating. At 12 in FIG. 1, the controller 122 obtains an experiment 123 (e.g., from an internal DOE data store 122a of the system 100 as shown in FIG. 2). The experiment includes definitions or specifications for two or more runs 124 (e.g., $run_1$ through $run_n$ in the example experiment $123_1$ of FIG. 1, where "n" is an integer greater than 1), and the controller 122 may store an integer number of predetermined experiments $123_1$-$123_i$, where i is a positive integer. In certain embodiments, the runs 124 of a given experiment 123 define at least one predetermined perturbation by which an operating point of at least one of the actuators 101 is offset from the actuator nominal operating point, with at least two of the runs 124 of each experiment 123 having different predetermined perturbations. In this manner, the selective perturbations with exercise the system actuators 101 to ascertain the combined and individual affects with respect to one or more characteristics of interest in the produced test products 107.

At 14 (FIG. 1), the controller 122 obtains nominal operating points from the model 122b that correspond to the desired characteristic(s) of a given test product, in this case, a desired test patch. The desired characteristics of such a test patch in certain embodiments includes color content, brightness/darkness, position on an ITB 104, size (width and height with respect to process direction), etc. The model 122b includes a lookup table or parametric equation and parameters for deriving or otherwise obtaining one or more nominal operating parameters (e.g., voltage, position, orientation, speed, etc.)

for each of two or more of the system actuators 101 that correspond to the desired test patch characteristic(s), where parametric model implementations can be used by solving a formula or equation for the operating point for each such control signal or value provided to the actuator 101, and LUT implementations involve the controller indexing the LUT 122b to discern the corresponding operating point(s), with or without interpolation or extrapolation operations.

At 16 (FIG. 1), the controller 122 automatically performs the experiment 123 by sequentially executing the corresponding runs 124 to produce a corresponding set of test products 107 according to at least one desired test product characteristic by using the nominal operating points obtained from the model, with certain operating points being offset by perturbation values defined in the runs 124. In each run 124, the controller 122 provides actuator control input signals or values to the actuators 101 to cause the marking device resources 102 to produce a test patch product 107 on a medium (e.g., an intermediate medium 104 or a final printed article 108 in FIG. 2) according to actuator nominal operating points defined by the at least one desired test product characteristic, where each run 124 will produce one or more corresponding test patch products 107. As noted, the DOE experiment 123 includes runs 124 defined such that each run 124 has at least one predetermined perturbation by which an operating point of at least one of the actuators 101 is offset from the actuator nominal operating point, and at least two of the runs 124 of the experiment 123 have different predetermined perturbations.

At 18, the controller 122 obtains measurements from the sensor(s) 160 of the desired test product characteristic(s) of the test products 107 produced in the runs 124.

A determination is made at 20 as to whether additional iterations are to be performed of the experiment 123. Further iterations can be done, for example, to allow subsequent analysis to factor in periodic or other types of noise in the system 100, or to account for spatial non-uniformities in the system 100, etc. If further iterations are to be done (e.g., according to a preprogrammed number of iterations stored in the parameters of the experiment 123, or according to a sensed condition based on the feedback from the sensors 160), the controller 122 may optionally reorder (change the sequence of) the runs 124 of the experiment 123 at 22, and the process returns to 16 to perform the runs 124 and to measure the corresponding new set of test patches 107 at 18 as described above. In certain embodiments, the controller 122 may randomize the sequence of the runs 124 for different iterations of the experiment 123. In certain embodiments, moreover, the controller 122 changes the location of the test patches 107 on the medium 104, 108 for different iterations of the experiment 123, alone or in combination with changes to the ordering of the sequence of runs 124. In certain implementations, the location of one or more of the test patches 107 on the medium 104, 108 is a perturbation of the experiment 123.

Any number of such iterations can be performed at 20, 22, each using the same desired test product characteristic(s) such that the resulting measurements of multiple sets of test patch products 107 can be analyzed. Once the specified number of iterations has been performed, the process proceeds to 24 in FIG. 1.

At 24, the controller 122 performs an analysis of the sensed characteristics of the set (or multiple sets) of test products 107 relative to the at least one desired test product characteristic. This analysis can be done by any suitable comparison algorithm or technique by which a determination is made as to the magnitude of estimated deviations in the produced test patch characteristics from the ideal or desired characteristics.

At 26, the controller estimates changes to parameters or lookup table entries of the model 122b based on the analysis and compares the estimated changes to a predetermined threshold at 28. If one or more estimated changes to the model are large (e.g., in excess of a corresponding threshold) based on the estimation and analysis (YES at 28), the controller 122 proceeds to 30 to selectively perform a fuller experiment 123 having a larger number of runs 124. In this embodiment, the controller 122 can run a quick initial DOE experiment 123 (with or without iterations), and if needed perform a more rigorous experiment 123 at 30 based on the results of the initial experiment, for instance, to test the control correlations by perturbations of more actuators 101, or to exercise the actuators 101 in more granular degrees, etc.

At 32, once the experiment(s) have been performed, the controller 122 selectively updates the correlations of the model 122b between desired product characteristics and actuator nominal operating points based in whole or in part on the analysis.

Figure 7:
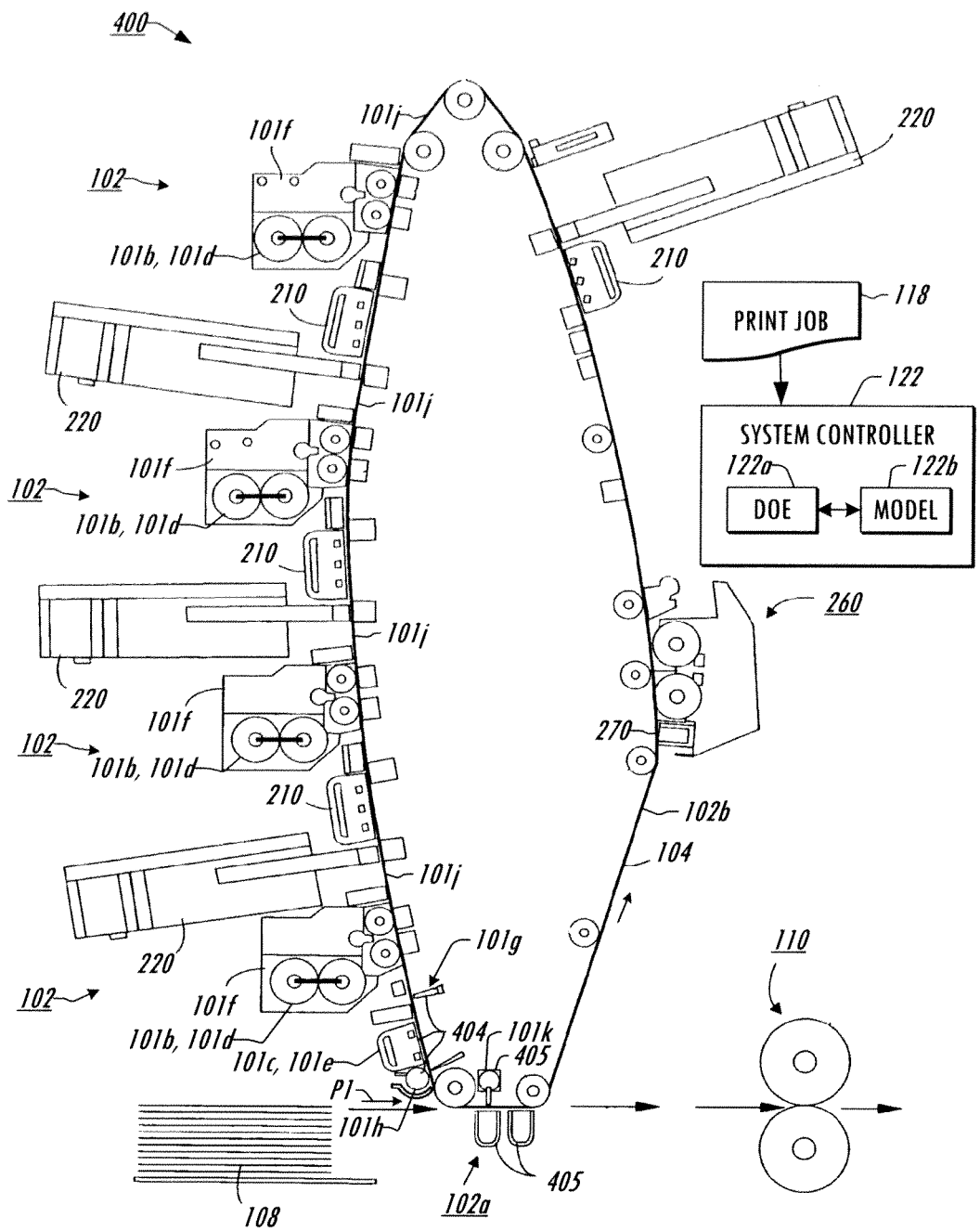
FIG. 7 is a system level diagram illustrating yet another exemplary multi-color document processing system with multiple xerographic marking devices and corresponding photoreceptor belt.
Figure 8:
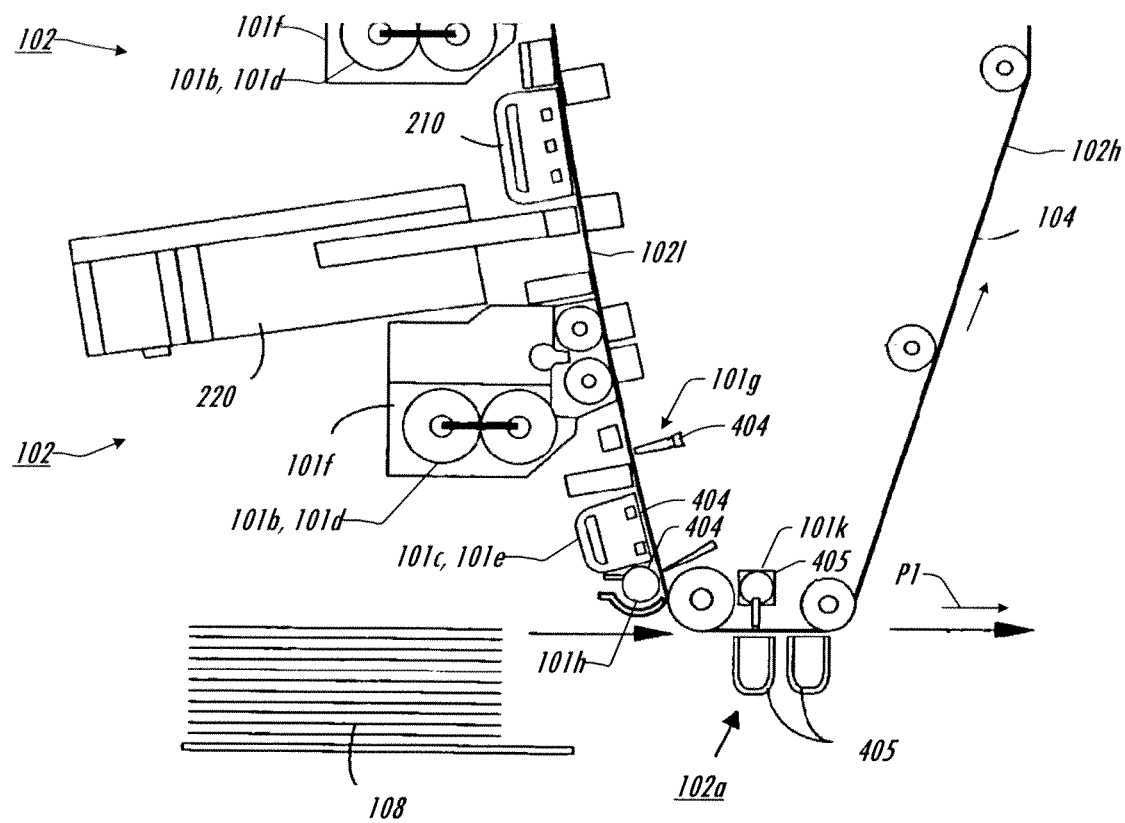
FIG. 8 is a partial system diagram illustrating an exemplary portion of the document processing system of FIG. 7.

FIGS. 7 and 8 illustrate another exemplary multi-color document processing system 400 in which the above described in-loop DOE model update approach can be implemented through exercising various actuators, some of which are associated with marking devices 102 and others that are not. The system 400 includes multiple xerographic marking devices 102 and corresponding photoreceptor belt 102b that also operates as an ITB 104, in which the paper path P1 flows from left to right, and the ITB 104 travels in a counterclockwise direction. As best shown in FIG. 8, each device 102 includes a pre-transfer expose (PTE) 101g, also called pre-transfer erase. The system 400 further includes a pre-transfer charge 101c, and a debris removal device 101h (e.g., hybrid air knife as best seen in FIG. 8) for debris removal. The pre-transfer erase 101g may be on the back of the photoreceptor in certain embodiments where the belt 104 is semi-transparent. In tandem ITB architectures, the pre-transfer erase 101g is preferably on the front surface of the photoreceptor drum (which is not transparent). 102a is a dicorotron, not a BTR, which generates a transfer field by depositing charge on the back of the medium 104. As in the case of a BTR, the field can be varied by adjusting the control biases on the dicorotron 102a. The photoreceptor belt is vibrated at ultrasonic frequencies to mechanically loosen the toner as the transfer field is applied by the dicorotron 102a. The system 400 further includes an acoustic transfer assist actuator 101k. The acoustic transfer assist actuator 101k is operative to selectively vibrate the photoreceptor belt 104 at ultrasonic frequencies to mechanically loosen the toner as the transfer field is applied by the dicorotron 102a. The system 400 is an image-on-image (IOI) type printing system 400 in which images are initially built on the photoreceptor belt 104 via the marking devices 102 including tandem configured charge and recharge components 210, exposing components 220, and developers 101f. The system 400 also provides pre-transfer and transfer components 404 (pre-transfer erase, etc.) and 405, respectively, to transfer the built image from the belt 104 to the final print media 108 as well as a system controller 122 that receives a print job 118. The system 400 includes a fuser type affixing apparatus 110 as well as cleaning and erasing actuator components 260 and 270, respectively.

Referring also to FIG. 9, execution of the experiment(s) 123 in certain embodiments is such that the test patches 107 are produced in an inter-panel zone (IPZ) or other zone of the medium 104, 108 while continuing production of non-test products or during non-production testing. FIG. 9 shows a top view of a portion of the exemplary photoreceptor belt 104 in the system of FIGS. 2 and 3 (and that of FIGS. 7 and 8) with image panel zones 105 separated by inter panel zones in which test patches 107 are marked for closed loop design of experiments adjustment of the printer model. The exemplary photoreceptor belt 104 includes a plurality of image panel zones 105 in which the marking stations 102 generate latent images as the belt 104 moves along a process direction 104p past the marking stations 102, where three exemplary panel zones 105a, 105b, and 105c are illustrated in the partial view of FIG. 9. Any number of panels 105 may be defined along the circuitous length of the photoreceptor 104, and the number may change dynamically based on the size of the printed substrates 108 being fed to the transfer mechanism 106 (FIG. 2), where the illustrated belt 104 includes about 11 such zones 105 for letter size paper sheet substrates 108. The panel zones 105 are separated from one another by inter panel zones IPZ, where two exemplary inter panel zones IPZ1 and IPZ2 are shown in FIG. 9, with IPZ1 being defined in a portion of the belt 104 that includes a belt seam 104s. As previously noted, the DOE model update operation can be performed separate from normal production, for instance, at system startup, shutdown, during periods of no/low production, and/or the controller 122 may enter the adjustment mode and perform the experiment(s) upon operator demand, periodically, or at other times, such as initiated by an external device through a network connection.

FIG. 10 shows another exemplary production system 100 in which the in-loop DOE model update techniques may be employed in a controller 122 that receives production jobs 118 and performs production using a plurality of resources 102, 108, 523-525 that may be actuated or operated according to signals from the controller 122 to produce one or more products 107. "Producing products", in this regard, can include modifying and/or moving products, objects, etc. The system 100 further includes a model 122b characterizing the system 100 and the resources thereof. The exemplary production system 100 is a modular printing system including a material supply component 108 that provides printable sheet substrates from one of two supply sources 108a and 108b, a plurality of print or marking engines 102, an output finisher station 523, a modular substrate transport system including a plurality of bidirectional substrate transport/router actuator components 524 (depicted in dashed circles in FIG. 10), one or more output sensors 160 disposed between the transport system 524 and the finisher 523, with the controller 122 providing control signals for operating the various actuator resources. The illustrated system 100 includes four print engines $102_1$, $102_2$, $102_3$, and $102_4$, although any number of such marking engines may be included, and further provides a multi-path transport highway with three bidirectional substrate transport paths 525a, 525b, and 525c. The transport actuator components 524 are operable by suitable routing signals from the controller 122 to transport individual substrate sheets from the supply 108 through one or more of the marking engines 102 (with or without inversion for duplex two-side printing), and ultimately to the output finishing station 523 where given print jobs are provided as output products 107. Each of the printing engines 102, moreover, may individually provide for local duplex routing and media inversion, and may be single color or multi-color printing engines operable via signals from the controller 122.

The described in-loop DOE techniques can be advantageously employed in a variety of production systems to minimize or mitigate incorrect control actions because of improved error estimates and improved model sensitivity estimates, which in turn result in improved actuator decision making. In printing systems, this can improve overall color stability. With respect to color control for a belt developed mass signature-induced (or correlated-to) disturbance, and assuming for illustrative purposes that color characteristic of a printed product 107 can be regulated by two actuators $U_1$ and $U_2$, y represents a response which may be some mid patch level and a solid (so y is a vector), or some image quality measure. Further assuming that each response y has the polynomial functional form shown in the following equation, and assuming for example a mid patch tone level is measured:

$$y_{mid}(j,k) = A \cdot U_1 + B \cdot U_2 + C \cdot U_1 \cdot U_2 + D + \eta_{jk} + \in_{jk},$$

where k indicates the location on the belt 104 and j is the sample number, A, B and C are sensitivity coefficients that are to be estimated and $\eta_{jk}$ and $\in_{jk}$ are the belt developed mass signature (not random) and the random noise, respectively. The following equation depicts the form for the solid patch (other patches would be similar):

$$y_{solid}(j,k) = A' \cdot U_1 + B' \cdot U_2 + C' \cdot U_1 \cdot U_2 + D' + \eta'_{jk} + \in'_{jk},$$

Table 1 below shows six measurements taken per belt revolution at the various actuator settings shown (it is assumed there are two levels indicated by – and +). In this case, and that of Table 2 below, a blocked experiment is implemented by the controller, in which the control input signals or values provided to the actuators are changed so as to prevent cyclic disturbances from producing biased parameter estimates.

TABLE 1

DOE Design Matrix used to Eliminate the Effect of Belt Signature on Model Estimates

| Index | $U_1$ | $U_2$ | $J_1$* $J_2$ | Dev Sig d st., $\eta_j$ | Random d st, $\in_j$ | Belt Rev, Loc |
|---|---|---|---|---|---|---|
| 1 | + | + | + | $\eta_1$ | $\in_1$ | 11 |
| 2 | + | – | – | $\eta_2$ | $\in_2$ | 12 |
| 3 | – | – | + | $\eta_3$ | $\in_3$ | 13 |
| 4 | – | + | – | $\eta_4$ | $\in_4$ | 14 |
| 5 | + | + | + | $\eta_5$ | $\in_5$ | 15 |
| 6 | – | + | – | $\eta_6$ | $\in_6$ | 16 |
| 7 |   |   | + | $\eta_1$ | $\in_7$ | 21 |
| 8 | – | + | – | $\eta_2$ | $\in_8$ | 22 |
| 9 | + | + | + | $\eta_3$ | $\in_9$ | 23 |
| 10 | + | – | – | $\eta_4$ | $\in_{10}$ | 24 |
| 11 | – | – | + | $\eta_5$ | $\in_{11}$ | 25 |
| 12 | + | – | – | $\eta_6$ | $\in_{12}$ | 26 |

In practice, the actuator levels can be considered as relatively small variations or perturbations about a current nominal operating point. With sufficiently small perturbations, a linear model without cross terms (commonly referred to in the art as interactions) may be used. The in-loop DOE actively probes the system 100 to obtain or update a suitable model 122b from which actuator set points can be determined for use in normal production. The illustrated DOE is arranged so that the belt signature factor can be eliminated by proper differencing, where "Loc" refers to the absolute location of the test patch 107 on the belt 104.

Initially, a measurement cycle is indicated either by priming from an external sensor, the customer usage pattern, and/or at a fixed cadence. A partial DOE (commonly referred to in the art as a fractional factorial) may be performed based on data with repeats, and a decision is made as to whether the system response has drifted and whether the current system model parameters have drifted. If the parameters have drifted, the DOE may be completed and new actuator values are calculated for updating the model 122b. Further, since more data is collected, with repeats, another test for statistical significant is performed to determine if the new actuator values should be applied to the system. In this way, incorrect control actions are minimized, while maintaining good control system tracking reacting to true system drift. If only 2 belt revolutions are used, there are now 12 measurements for unbiased estimate of A, 12 measurements for unbiased estimate of B, 12 measurements for unbiased estimate of C, and 12 measurements for an unbiased estimate of D. Furthermore, pure error estimates can be designed into the experiment runs 124 as needed. For example, adding only two more reads per belt revolution can give an estimate of $\in_{jk}$ with three degrees of freedom (DOF). Estimates of $\in_{jk}$ can be lumped with prior estimates for greater precision. Direct estimates of $\eta_{jk}$ are also possible using this experiment 123.

For example, to estimate the coefficient A, the controller 122 can sum responses for runs 1, 2, 5, 9, 10, and 12; then sum the responses from runs 3, 4, 6, 7, 8, and 11; then take the difference between the two sums and divide by 12. Due to symmetrical design of the DOE experiment 123, the effect of the belt signature correlated noise is removed from estimation of the model coefficients. With knowledge of the coefficients the controller 122 can update the controller model 122b (e.g., gains, structure) to improve performance, solve for a suitable actuator set point and go directly (dead beat) to the setpoint, open loop slew to that set point, or closed loop integrate to that set point, and initiate a setup or diagnostic routine.

In solving for the actuator set points the controller 122 can also optimize a cost function if used, for instance, when there are fewer actuators 101 than measurements. Measurements may include single separations, overlays, and multiple points along TRC.

For a more general case where the controller 122 is required to simultaneously optimize multiple responses using multiple control actuators 101, a more general model is represented by the following equation:

$$y_i = F_i(u_1, u_2, \ldots, u_M),$$

where the subscripts j and k are suppressed for clarity and i=1, 2, ..., N and m=1, 2, ..., M, where N is the number responses and M is the number of actuators 101. Assuming $y_i^d$ indicates the desired target value for response $y_i$, these are the output values to which the controller 122 is to drive the system 100. Assuming $u_i^d$ indicates the desired target value, if any, for actuator $u_i$, the following equation shows a quadratic cost function:

$$J(u_1, u_2, \ldots, u_M) = \sum_{i=1}^{N} \omega_y^i \cdot (y_i^d - y_i)^2 + \sum_{m=1}^{M} \omega_u^m \cdot (u_m^d - u_m)^2,$$

where $\omega_y^i$ and $\omega_u^m$ are non-negative weighting values used to emphasize or de-emphasize particular responses or inputs in the optimization, respectively. Combining the above equations results in the following equation:

$$J(u_1, u_2, \ldots, u_M) = \sum_{i=1}^{N} \omega_y^i \cdot (y_i^d - F_i(u_1, u_2, \ldots, u_M))^2 + \sum_{m=1}^{M} \omega_u^m \cdot (u_m^d - u_m)^2,$$

which explicitly shows how the actuator values impact the cost function. The cost function is then optimized using techniques from quadratic programming, resulting in the optimal actuator values. This is depicted in the following equation:

$$\underline{u}_{OPT} = \mathrm{argmin} J(\underline{u}),$$

where $u=[u_1, u_2, \ldots, u_m]^T$ is a vector of actuator values and $\underline{u}_{OPT}$ is the vector of optimal actuator values. This is subject to the lower level and upper level constraint on the actuator values, as depicted in the following equation:

$$L_m < u_m < U_m, \forall m,$$

where $L_m$ and $U_m$ are the lower and upper limits, respectively. This accounts for actuator saturation and any latitude boundaries that need to be imposed on the actuator values.

Other designs are possible depending on a priori knowledge, and the coefficients do not need to be completely recomputed. Past estimates can, with reduced weighting, be included in the current estimates. The controller 122 can block also on the slow actuator "% TC set point" and identify its effect. After solving for the coefficients, the controller 122 can directly compute the actuator set points. However, in a new region the model 122b may be inaccurate, and further iterations may be helpful.

In another example, if 8 reads can be taken in a belt revolution, then for two belt revolutions, the controller 122 can construct the DOE experiment 123 shown in the following Table 2 to provide 16 measurements for an unbiased estimate of A, 16 measurements for an unbiased estimate of B, 16 measurements for an unbiased estimate of C, and 16 measurements for an unbiased estimate of D. Again, symmetric design in the DOE experiment 123 enables estimates of the model parameters independent of the fixed belt signature. Further, equations similar to those described above can be used to determine statistical significance of the response and model change, to calculate the estimates, and to calculate the control actions required, if necessary, to achieve the desired outputs.

TABLE 2

DOE Design Matrix Providing better Estimate Support using only 2 Belt Revs

| Index | $U_1$ | $U_2$ | $U_1*U_2$ | Dev Sig dist, $\eta_i$ | Random dist, $\epsilon_i$ | Belt Rev, Loc |
|---|---|---|---|---|---|---|
| 1 | + | + | + | $\eta_1$ | $\epsilon_1$ | 1, 1 |
| 2 | + | − | − | $\eta_2$ | $\epsilon_2$ | 1, 2 |
| 3 | − | + | − | $\eta_3$ | $\epsilon_3$ | 1, 3 |
| 4 | − | − | + | $\eta_4$ | $\epsilon_4$ | 1, 4 |
| 5 | + | + | + | $\eta_5$ | $\epsilon_5$ | 1, 5 |
| 6 | − | − | + | $\eta_6$ | $\epsilon_6$ | 1, 6 |
| 7 | − | + | − | $\eta_7$ | $\epsilon_7$ | 1, 7 |
| 8 | + | − | − | $\eta_8$ | $\epsilon_8$ | 1, 8 |
| 9 | + | − | − | $\eta_1$ | $\epsilon_9$ | 2, 1 |
| 10 | − | + | − | $\eta_2$ | $\epsilon_{10}$ | 2, 2 |
| 11 | − | − | + | $\eta_3$ | $\epsilon_{11}$ | 2, 3 |
| 12 | + | + | + | $\eta_4$ | $\epsilon_{12}$ | 2, 4 |
| 13 | − | − | + | $\eta_5$ | $\epsilon_{13}$ | 2, 5 |
| 14 | − | + | − | $\eta_6$ | $\epsilon_{14}$ | 2, 6 |
| 15 | + | − | − | $\eta_7$ | $\epsilon_{15}$ | 2, 7 |
| 16 | + | + | + | $\eta_8$ | $\epsilon_{16}$ | 2, 8 |

The in-loop DOE techniques described herein advantageously facilitate adaptation of control through the updated model 122b to a time varying production process, where the DOE factor levels are defined as perturbations relative to the current operating values of the actuators 101, and a resulting DOE regression model can be used to define a change in actuator settings to drive the system to the desired output. Moreover, specific DOE experiment designs 123 can be used whose factor levels are symmetric about a periodic noise source such as a photoreceptor belt signature, resulting in model parameters that are independent of belt position. The in-loop DOE techniques can thus adapt to system parameter changes & disturbance behavior changes, and provides noise handling properties.

When implemented for xerographic control, the technique can account for development signatures explicitly and can estimate residual errors that can be used to determine CUC (cycle up convergence) thresholds on the fly, where such CUC thresholds may adapt or be a function of the inherent noise within the system 100. The in-loop DOE techniques of the present disclosure, moreover, are time efficient, and maximally utilize the data to provide statistically efficient estimates of model parameters and fast convergence rates (deadbeat like behavior is possible, or actuators can slew so as to prevent sudden color shifts) during cycle up or during runtime in the event of a perturbation.

The in-loop DOE techniques also easily accommodate multi-input and multi-output systems for both square (same number of outputs as actuators) and non square systems (number of outputs not equal to number of actuators). In addition, the techniques share characteristics and properties with model predictive control (MPC) and response surface optimization methodologies (RSM) in that optimal actuation can be determined subject to constraints & weight penalties on inputs and/or outputs (measured or otherwise). Moreover, the in-loop DOE accommodates many configurations that can be designed to suit a given situation and reach a balance between performance and cost, since many algorithms are possible (e.g., Full/fractional factorial, Central Composite designs, Plackett-Burman, etc.).

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A production system, comprising:
at least one resource operative to perform at least one production operation to produce products;
a plurality of actuators individually operative according to a corresponding actuator control input signal or value to facilitate production of products using the at least one resource;
a model including correlations between desired product characteristics and nominal operating points of the actuators;
a controller coupled with the production resource and the actuators and operative to automatically perform an experiment including a plurality of runs to produce a corresponding set of test products according to at least one desired test product characteristic, the controller providing actuator control input signals or values to the actuators in each run of the experiment to cause the resource to produce a test product according to actuator nominal operating points defined by the at least one desired test product characteristic, with each run including at least one predetermined perturbation by which an operating point of at least one of the actuators is offset from the actuator nominal operating point, where at least two of the runs of the experiment have different predetermined perturbations; and
at least one sensor coupled with the controller and operative to sense the at least one desired test product characteristic of the test products;
the controller being operative to perform an analysis of the sensed characteristics of the set of test products relative to the at least one desired test product characteristic and to selectively update the correlations between desired product characteristics and actuator nominal operating points of the model at least partially according to the analysis;
where the system is a document processing system, comprising at least one marking device resource operative to transfer marking material onto a corresponding medium to produce test patch products;
where the plurality of actuators are individually operative according to a corresponding actuator control input signal or value to adjust an operating parameter associated with transfer of marking material onto the medium;
where the at least one sensor is operative to sense a marking material transfer condition associated with the test patch products:
where the controller operatively coupled with the marking device resource and operative to selectively cause the at least one marking device to transfer marking material onto the medium, the controller being operative to automatically perform the experiment including a plurality of runs to produce a corresponding set of test patches on the medium according to at least one desired test patch characteristic, the controller providing actuator control input signals or values to the actuators in each run of the experiment to cause the marking device to produce a test patch on the medium according to actuator nominal operating points defined by the at least one desired test patch characteristic, with each run including at least one predetermined perturbation by which an operating point of at least one of the actuators is offset from the actuator nominal operating point, where at least two of the runs of the experiment have different predetermined perturbations, the controller being operative to perform the analysis of the sensed characteristics of the set of test patches relative to the at least one desired test patch characteristic and to selectively update the correlations between desired test patch characteristics and actuator nominal operating points of the model at least partially according to the analysis; and where the location of the test patches on the medium is a perturbation of the experiment.

2. The system of claim 1, where the controller is operative to perform multiple iterations of the experiment, to perform the analysis of multiple sets of test products, and to selectively update the correlations between desired product characteristics and actuator nominal operating points of the model at least partially according to the analysis.

3. The system of claim 2, where the controller is operative to change the sequence of the runs for different iterations of the experiment.

4. The system of claim 3, where the controller is operative to randomize the sequence of the runs for different iterations of the experiment.

5. The system of claim 1, where the controller stores at least one predetermined experiment.

6. The system of claim 5, where the experiment is a blocked experiment including a plurality of runs in which the controller actuator changes the control input signals or values provided to the actuators to prevent cyclic disturbances from producing biased parameter estimates.

7. The system of claim 1, where the controller is operative to estimate changes to parameters or lookup table entries of the model based on the analysis and to selectively perform a fuller experiment having a larger number of runs if at least one of the estimated changes is above a threshold.

8. The system of claim 1, wherein the marking device resources are xerographic marking devices.

9. The system of claim 1, where the controller is operative to automatically perform the experiment including a plurality of runs to produce the test patches in an inter-panel zone or other zone of the medium while continuing production of non-test products.

10. The system of claim 2, where the controller is operative to change the location of the test patches on the medium for different iterations of the experiment.

11. A method of updating a production system model, the method comprising:
automatically performing an experiment including a plurality of runs to produce a corresponding set of test products according to at least one desired test product characteristic using at least one production system resource of a production system, including providing actuator control input signals or values to a plurality of actuators in each run of the experiment to cause the resource to produce a corresponding test product according to actuator nominal operating points defined by the at least one desired test product characteristic, with each run including at least one predetermined perturbation by which an operating point of at least one of the actuators is offset from the actuator nominal operating point, where at least two of the runs of the experiment have different predetermined perturbations;
sensing the at least one desired test product characteristic of the test products produced in the experiment;
analyzing the sensed characteristics of the set of test products relative to the at least one desired test product characteristic; and
selectively updating correlations between desired product characteristics and actuator nominal operating points of a system model at least partially according to the analysis;
where the system is a document processing system with at least one marking device resource operative to transfer marking material onto a corresponding medium to produce test patch products;
where the plurality of actuators are individually operative according to a corresponding actuator control input signal or value to adjust an operating parameter associated with transfer of marking material onto the medium:
where automatically performing the experiment comprises providing actuator control input signals or values to the actuators in each run of the experiment to cause the resource to produce a set of test patches on the medium according to at least one desired test patch characteristic, with each run including at least one predetermined perturbation by which an operating point of at least one of the actuators is offset from the actuator nominal operating point, where at least two of the runs of the experiment have different predetermined perturbations;
where sensing the at least one desired test product characteristic of the test products comprises sensing a marking material transfer condition associated with the test patches;
where analyzing the sensed characteristics of the set of test products comprises analyzing the sensed characteristics of the set of test patches relative to the at least one desired test patch characteristic; and
where selectively updating the correlations comprises selectively updating the correlations between desired test patch characteristics and actuator nominal operating points of the model at least partially according to the analysis;
further comprising automatically performing the experiment including a plurality of runs to produce the test patches in an inter-panel zone or other zone of the medium while continuing production of non-test products.

12. The method of claim 11, comprising:
performing multiple iterations of the experiment;
analyzing multiple sets of test products; and
selectively updating the correlations between desired product characteristics and actuator nominal operating points of the model at least partially according to the analysis.

13. The method of claim 12, comprising changing the sequence of the runs for different iterations of the experiment.

14. The method of claim 12, where automatically performing the experiment comprises performing a blocked experiment including changing the actuator control input signals or values to prevent cyclical disturbances from producing biased parameter estimates.

15. The method of claim 11, comprising:
estimating changes to parameters or lookup table entries of the model based on the analysis; and
selectively performing a fuller experiment having a larger number of runs if at least one of the estimated changes is above a threshold.

16. The method of claim 14, comprising changing the location of the test patches on the medium for different iterations of the experiment.

17. A production system, comprising:
at least one resource operative to perform at least one production operation to produce products;
a plurality of actuators individually operative according to a corresponding actuator control input signal or value to facilitate production of products using the at least one resource;
a model including correlations between desired product characteristics and nominal operating points of the actuators;
a controller coupled with the production resource and the actuators and operative to automatically perform an experiment including a plurality of runs to produce a corresponding set of test products according to at least one desired test product characteristic, the controller providing actuator control input signals or values to the actuators in each run of the experiment to cause the resource to produce a test product according to actuator nominal operating points defined by the at least one desired test product characteristic, with each run including at least one predetermined perturbation by which an operating point of at least one of the actuators is offset from the actuator nominal operating point, where at least two of the runs of the experiment have different predetermined perturbations; and at least one sensor coupled with the controller and operative to sense the at least one desired test product characteristic of the test products;

the controller being operative to perform an analysis of the sensed characteristics of the set of test products relative to the at least one desired test product characteristic and to selectively update the correlations between desired product characteristics and actuator nominal operating points of the model at least partially according to the analysis;

where the system is a document processing system, comprising at least one marking device resource operative to transfer marking material onto a corresponding medium to produce test patch products;

where the plurality of actuators are individually operative according to a corresponding actuator control input signal or value to adjust an operating parameter associated with transfer of marking material onto the medium;

where the at least one sensor is operative to sense a marking material transfer condition associated with the test patch products; and where the controller operatively coupled with the marking device resource and operative to selectively cause the at least one marking device to transfer marking material onto the medium, the controller being operative to automatically perform the experiment including a plurality of runs to produce a corresponding set of test patches on the medium according to at least one desired test patch characteristic, the controller providing actuator control input signals or values to the actuators in each run of the experiment to cause the marking device to produce a test patch on the medium according to actuator nominal operating points defined by the at least one desired test patch characteristic, with each run including at least one predetermined perturbation by which an operating point of at least one of the actuators is offset from the actuator nominal operating point, where at least two of the runs of the experiment have different predetermined perturbations, the controller being operative to perform the analysis of the sensed characteristics of the set of test patches relative to the at least one desired test patch characteristic and to selectively update the correlations between desired test patch characteristics and actuator nominal operating points of the model at least partially according to the analysis; and where the controller is operative to automatically perform the experiment including a plurality of runs to produce the test patches in an inter-panel zone or other zone of the medium while continuing production of non-test products.

18. The system of claim 17, wherein the marking device resources are xerographic marking devices.

19. The system of claim 17, where the controller is operative to perform multiple iterations of the experiment, to perform the analysis of multiple sets of test patches, and to selectively update the correlations between desired test patch characteristics and actuator nominal operating points of the model at least partially according to the analysis.

20. The system of claim 19, where the controller is operative to change the sequence of the runs for different iterations of the experiment.

21. The system of claim 20, where the controller is operative to randomize the sequence of the runs for different iterations of the experiment.

22. The system of claim 19, where the controller is operative to change the location of the test patches on the medium for different iterations of the experiment.

23. The system of claim 19, where the location of the test patches on the medium is a perturbation of the experiment.

24. The system of claim 23, where the experiment is a blocked experiment including a plurality of runs in which the controller actuator changes the control input signals or values provided to the actuators to prevent cyclic disturbances from producing biased parameter estimates.

25. A method of updating a production system model, the method comprising:

automatically performing an experiment including a plurality of runs to produce a corresponding set of test products according to at least one desired test product characteristic using at least one production system resource of a production system, including providing actuator control input signals or values to a plurality of actuators in each run of the experiment to cause the resource to produce a corresponding test product according to actuator nominal operating points defined by the at least one desired test product characteristic, with each run including at least one predetermined perturbation by which an operating point of at least one of the actuators is offset from the actuator nominal operating point, where at least two of the runs of the experiment have different predetermined perturbations;

sensing the at least one desired test product characteristic of the test products produced in the experiment;

analyzing the sensed characteristics of the set of test products relative to the at least one desired test product characteristic;

selectively updating correlations between desired product characteristics and actuator nominal operating points of a system model at least partially according to the analysis;

performing multiple iterations of the experiment;

analyzing multiple sets of test products;

selectively updating the correlations between desired product characteristics and actuator nominal operating points of the model at least partially according to the analysis; and changing the location of the test patches on the medium for different iterations of the experiment;

where automatically performing the experiment comprises performing a blocked experiment including changing the actuator control input signals or values to prevent cyclical disturbances from producing biased parameter estimates.

26. The method of claim 25, comprising changing the sequence of the runs for different iterations of the experiment.

* * * * *